US009639328B2

(12) United States Patent
Narayanamoorthy et al.

(10) Patent No.: US 9,639,328 B2
(45) Date of Patent: May 2, 2017

(54) MULTIPLICATION CIRCUIT PROVIDING DYNAMIC TRUNCATION

(71) Applicant: Wisconsin Alumni Research Foundation, Madison, WI (US)

(72) Inventors: Srinivasan Narayanamoorthy, Hillsboro, OR (US); Nam Sung Kim, Middleton, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 356 days.

(21) Appl. No.: 14/453,172

(22) Filed: Aug. 6, 2014

(65) Prior Publication Data

US 2016/0041813 A1 Feb. 11, 2016

(51) Int. Cl.
*G06F 7/38* (2006.01)
*G06F 7/523* (2006.01)
*G06F 1/32* (2006.01)
*G06F 7/499* (2006.01)

(52) U.S. Cl.
CPC .............. *G06F 7/523* (2013.01); *G06F 1/32* (2013.01); *G06F 7/49936* (2013.01)

(58) Field of Classification Search
CPC .................................. G06F 7/523; G06F 1/32
USPC ................................................ 708/550–551
See application file for complete search history.

(56) References Cited

U.S. PATENT DOCUMENTS 4,604,722 A * 8/1986 Staplin, Jr. .............. G06F 7/491
708/200
6,957,244 B2 * 10/2005 Jou ......................... G06F 7/523
708/550

OTHER PUBLICATIONS

Chippa et al.; "Scalable effort hardware design: Exploiting algorithmic resilience for energy efficiency," in IEEE/ACM Design Automation Conf., 2010, pp. 555-560; US.
Kulkarni et al.; "Trading Accuracy for Power with an Underdesigned Multiplier Architecture," in IEEE VLSID, 2011, pp. 346-351, US.
Babic et al.; "An iterative logarithmic multiplier," Microprocessors and Microsyst., vol. 35; No. 1, pp. 23-33, 2011; Slovenia.
Gupta et al.; "IMPACT: IMPrecise adders for low-power approximate computing," in IEEE/ACM Int. Symp. Low Power Electronics and Design (ISLPED), 2011, pp. 409-414; US.

* cited by examiner

*Primary Examiner* — Tan V. Mai
(74) *Attorney, Agent, or Firm* — Boyle Fredrickson, S.C.

(57) ABSTRACT

A fixed-point multiplier providing reduced energy usage dynamically truncates received operands according to the location of computationally important bits in the operands and provides the truncated operands to a reduced width multiplier offering reduced energy usage. Information about the location of the dynamic truncation is used to properly shift the result of the multiplier to provide an approximation of full multiplication of the operands.

17 Claims, 4 Drawing Sheets

FIG. 5d

MULTIPLICATION CIRCUIT PROVIDING DYNAMIC TRUNCATION

STATEMENT REGARDING FEDERALLY SPONSORED RESEARCH OR DEVELOPMENT

This invention was made with government support under 0953603 awarded by the National Science Foundation. The government has certain rights in the invention.

CROSS REFERENCE TO RELATED APPLICATION

Background of the Invention

The present invention, relates to a computer architecture employing a hardware multiplier circuit, and in particular to a multiplier circuit dynamically truncating its operands to implement a flexible trade-off between accuracy and energy consumption.

Achieving energy efficiency is important in mobile computing devices such as smart phones and tablets because of their reliance on battery power and the size and weight constraints of such devices which limit battery size and capacity. At the same time, such mobile computing devices are increasingly using sophisticated human machine interfaces (HMIs) relying on techniques such as speech recognition, handwriting recognition, and gesture recognition. Such "recognition" tasks may require large numbers of multiplication operations, for example, associated with matrix multiplication.

Demands for high-speed multiplication are normally handled by specialized hardware multipliers. Such hardware multipliers have large energy demands that can substantially affect battery life of portable devices.

SUMMARY OF THE INVENTION

The present invention dynamically truncates multiplication operands to capture their most important bits allowing multiplication to be performed using a much smaller multiplier. By reducing the size of the multiplier, a significant decrease in energy consumption can be realized. Dynamic truncation, as opposed to fixed truncation, offers improved error reduction. The present inventors have determined that dynamic truncation can be accomplished without negating the energy efficiency gains expected from a reduced multiplier size.

In one embodiment, the invention provides a multiplication circuit for use in an electronic processor that may receive a first and second operand. The multiplication circuit selects a first subset operand from the first operand of bit length m less than the bit length n of the first operand, according to a position of a leading non-sign bit in the first operand, and then outputs a product between the subset operand and the second operand.

It is thus a feature of at least one embodiment of the invention to reduce the size of at least one operand by dynamically truncating the operand according to the location of the leading non-sign bit to better preserve computationally important bits of the operand.

The product may be provided by a fixed-point multiplier limited to receiving operands no greater than m-bits in length.

It is thus a feature of at least one embodiment of the invention to leverage the quadratic gains in energy efficiency possible by reducing fixed-point multiplier circuitry such as may offset the additional complexity of dynamic operand truncation.

The multiplier circuit may select the first subset operand to include a leading non-sign bit of the first operand and only bits of lower significance than the leading non-sign bit up to the total bit length of n.

It is thus a feature of at least one embodiment of the invention to provide a simple truncation system driven by the location of the leading non-sign bit.

In one embodiment, the multiplier circuit may select the first subset operand to have a most significant bit of the first subset operand equal to the leading non-sign bit. This approach will be termed the "dynamic segment method".

It is thus a feature of at least one embodiment of the invention to provide, in one embodiment, a dynamic truncation system that maximizes the capture of the most significant bits by aligning the truncation subset with the most significant non-sign bit when possible.

In this embodiment, the multiplication circuit may include a leading one detection circuit, an input shifter, and an output shifter, the leading one detection circuit detecting the location of a most significant non-sign bit in the first operand. The leading one detection circuit may control the input shifter to select bits of the first operand for multiplication. The leading one detection circuit may further control the output shifter shifting the output to different positions in an output word provided by the leading one detection circuit.

It is thus a feature of at least one embodiment of the invention to provide dynamic truncation that may be implemented with well-understood functional blocks of computer architecture.

Alternatively, the multiplier circuit may select the first subset operand from only less than three n/2 predetermined subsets of the first operand. This approach will be designated the "static segment method" or "extended static segment method".

It is thus a feature of at least one embodiment of the invention to greatly simplify the multiplier circuit by eliminating the need for a leading one detector and shifter for truncating the operands in favor of simpler circuit structures.

In this second embodiment, the multiplication circuit may include a logical OR circuit, a multiplexer, and a demultiplexer. The logical OR circuit may detect the presence of a set bit in at least one of the predefined subsets to select the first subset as a subset including a most significant non-sign bit. The logical OR circuit may control a multiplexer selecting bits of the selected subset of the first operand for multiplication and further control the demultiplexer shifting the output to different positions in an output word provided by the multiplication circuit.

It is thus a feature of at least one embodiment of the invention to make use of simple OR-gate and multiplexer circuitry to implement the dynamic truncation.

The subset size of m may be greater than or equal to one-half of n.

It is thus a feature of at least one embodiment of the invention provide an effective trade-off between preserving accuracy in the truncation and minimizing the segment selection circuitry.

The multiplication, circuit may further receives a third operand having a bit length of n bits and may select as the second operand a subset of the third operand having a bit length m less than n selected from the third operand according to the position of a leading one in the third operand.

It is thus a feature of at least one embodiment of the invention to permit the truncation of both operands to the multiplier.

The electronic computer may further include a memory holding the second operand stored in memory and wherein the second operand has a bit length of n bits.

It is thus a feature of at least one embodiment of the invention to permit a pre-storage of truncated operands, for example, in situations where the operands are precomputed coefficients, further reducing circuitry overhead.

The electronic computer may include a battery power supply providing power to circuitry of the electronic computer and at least one of a wireless communication transceiver, a graphics display screen and a camera.

It is thus a feature of at least one embodiment of the invention to significantly reduce power consumption of common portable electronic devices such as tablets, cell phones and the like.

These particular objects and advantages may apply to only some embodiments falling within the claims and thus do not define the scope of the invention.

BRIEF DESCRIPTION OF THE DRAWINGS

FIGS. 5a-5d are a set of diagrams showing the four different truncation options based on the location of computationally significant bits in the operand using the circuit of FIG. 4 and the resulting necessary shifting of the multiplication product in the output word to one of three positions:

DETAILED DESCRIPTION OF THE PREFERRED EMBODIMENT

Figure 1:
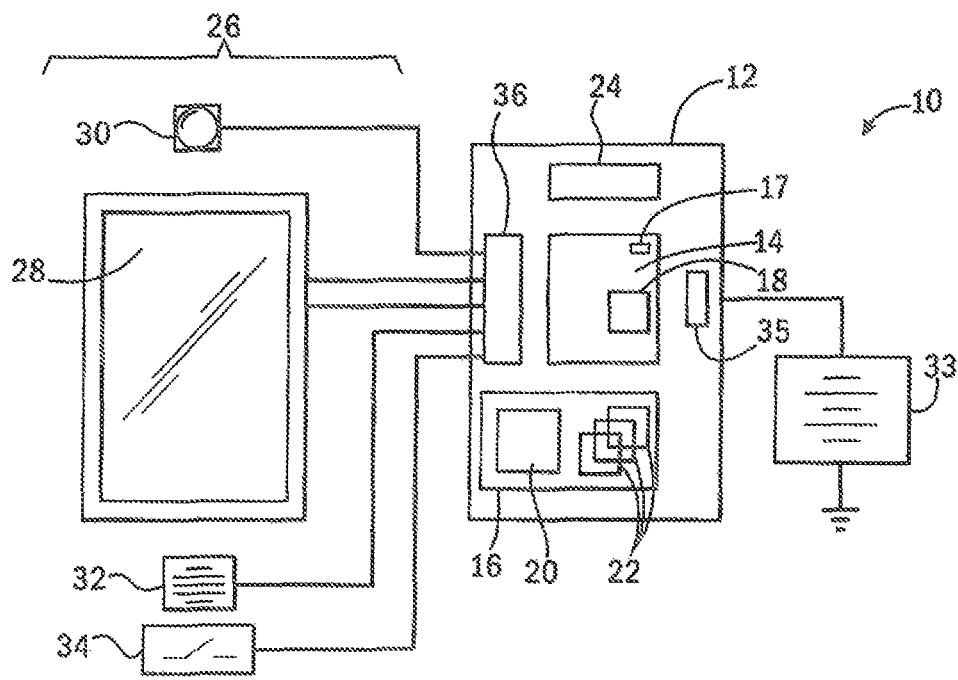
FIG. 1 is a simplified block diagram of the circuitry of an example mobile device such as a cell phone showing a processor having a multiplier circuit of the present invention.

Referring now to FIG. 1, a portable computational device 10, such as a cell phone may provide a hardware platform 12, for example, contained on a circuit card or the like, composed of inter-communicating circuit elements including a processor 14 and associated memory 16.

The processor 14 may be a single or multicore processor and may include a hardware multiplier circuit 18 as will be described below either integrated into the processor or as a coprocessor. In one embodiment, the processor 14 or another element of the platform 12 may provide for a temperature sensor 17 as will be discussed below.

As is generally understood in the art, during operation of the computational device 10, the processor 14 executes programs contained in the memory 16 including, for example, an operating system 20 and multiple application and driver programs 22. The memory may also include data files (not shown) holding data used by the operating system 20 or application and driver programs 22.

The portable computational device 10 may provide for a human machine interface 26 including, for example, a graphic touch screen 28 allowing for touch inputs and the display of graphic information on an LCD screen or the like, a digital camera 30, a microphone 32, and one or more electrical switches 34 that may include a keyboard. Signals to and from each of these elements may pass through interface circuit 36 also communicating with the processor 14.

When the portable computational device 10 is a cell phone, the processor 14 may also communicate with a radiofrequency transceiver 24 or the like providing for radiofrequency communications and associated protocols including cell phone protocols, wireless protocols such as IEEE 802.11 and the like, Bluetooth and other such communication formats.

The portable computational device 10 may receive power from a battery 33 that may be monitored and controlled by battery management circuit 35, the latter of which may monitor the charge state of the battery and may control power usage of the other circuit elements of the hardware platform 12 to conserve battery power including, for example, turning off various of the circuit elements described above including a backlight on the touch screen 28 and putting the processor 14 or other circuit elements into a sleep state and limiting power usage by the radiofrequency transceiver 24.

While a cell phone has been described, it will be recognized that a similar structure is used in many portable electronic devices including tablet and laptop computers and this description is intended to provide useful background rather than to be it will also be appreciated that these functional blocks need not be separate circuit elements but may be arbitrarily allocated among different or single integrated circuits and are presented as discrete functional blocks for clarity of description. In general, these functions may be freely allocated between dedicated hardware and software.

Figure 2:
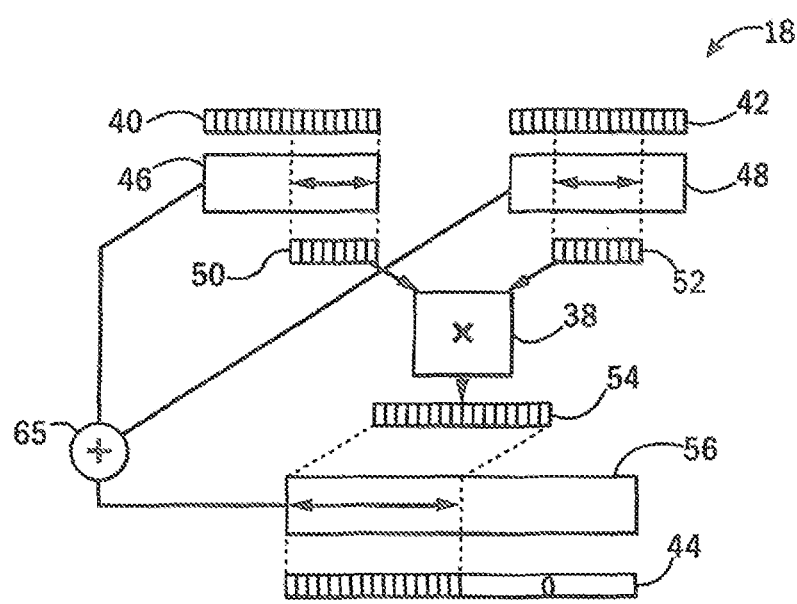
FIG. 2 is a simplified block diagram of the multiplier circuit of the present invention that may receive and dynamically truncate operands to be multiplied using a reduced-size, fixed-point multiplier.

Referring now to FIG. 2, in the present invention, the hardware multiplier circuit 18 may receive a first operand 40 and second operand 42 (for example, 16-bit operands) in the form of parallel binary digital data and provides a full product 44 (for example, a 32-bit product) output as parallel binary digital data. The length of the first operand 40 and second operand 42 will be designated "n".

Before multiplication, the operands 40 and 42 are received by respective dynamic truncation circuits 46 and 48 which serve to truncate the operands 40 and 42 to a length m (for example, 8-bits) where in is less than n. For reasons of efficiency, m will normally be selected to be greater than or equal to one-half of n and normally less than or equal to two-thirds of n. The truncated operands will be designated as a first subset operand 50 and second subset operand 52 respectively.

The first subset operand 50 and second subset operand 52 may be selected from various locations within the larger operands 40 and 42, respectively, not simply from the most significant places of those operands 40 and 42 as would be the case in standard truncation. Several methods of implementing the dynamic truncation circuits 46 and 48 and identifying portions of the operands 40 and 42 used as the subset operands 50 and 52 will be discussed below.

The first and second subset operands 50 and 52 are provided to a fixed-point multiplier 38 limited in size to accept only operands that have been limited in length to m. Generally the size of a fixed-point multiplier will significantly affect its energy consumption. For example, a fixed-point multiplier receiving operands of length four (4×4) will consume almost 20 times less power than a fixed-point multiplier receiving operands of length 16 (16×16). Similarly, a fixed-point multiplier receiving a operand length of eight (8×8) will use almost 5 times less energy than the 16×16 multiplier. A fixed-point multiplier may be distinguished from a floating-point multiplier which keeps separate track of a mantissa and exponent.

The multiplier 38 produces a short product 54 smaller than the full product 44 of the multiplier circuit 18. The short product 54 will generally have a size of 2n (in this example: 16-bits) and is received by an alignment circuit 56 which must locate the short product 54 within the full product 44. This location will be a function of the location from which the first subset operand 50 and second subset operand 52 are extracted from their respective operands 40 and 42. The calculation of the offsetting process will be described below.

Generally the truncation of the operand 40 and 42 will reduce the accuracy of the full product 44. Nevertheless, the present inventors have recognized that reduced accuracy multiplication is acceptable in many applications where there is algorithmic fault tolerance (AFP). Examples of such applications include speech recognition, handwriting recognition, and gesture recognition using an algorithm such as artificial neural networks, liquid state machines, support vector machines or the like.

Dynamic Segment Method (DSM)

Figure 3:
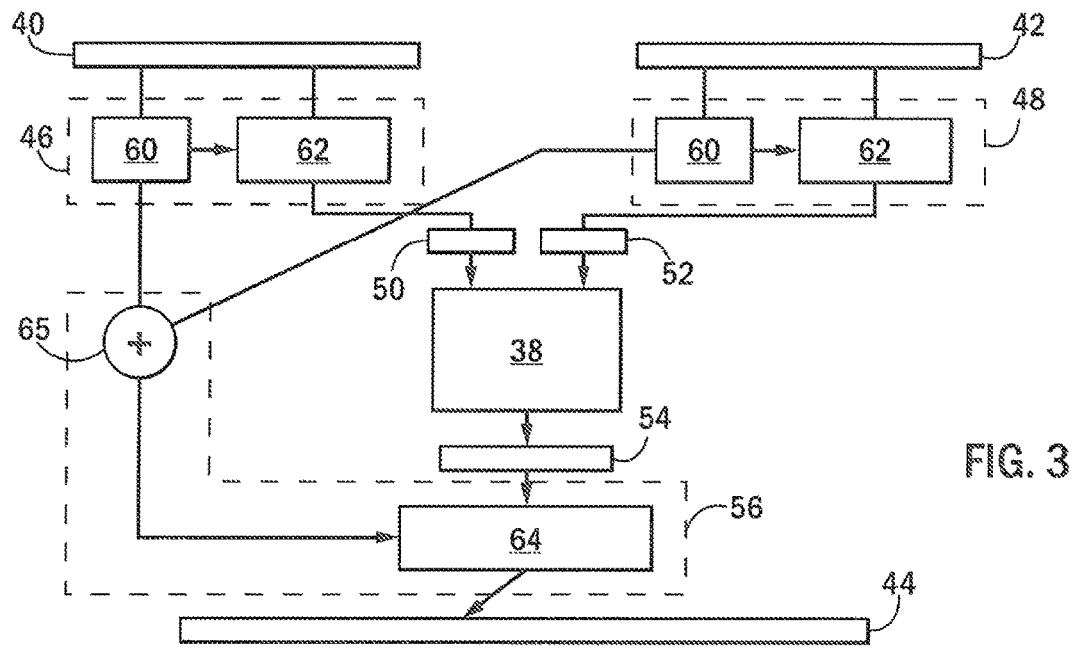
FIG. 3 is a detailed block diagram of the multiplier circuit of FIG. 2 including leading one detectors and shifters for each operand to maximize the capture of computationally significant bits in the truncation process.

Referring now to FIG. 3, in a first embodiment, the truncation circuits 46 and 48 may be implemented by a leading one detector 60 and shifter 62 associated with each of the operands 40 and 42. The leading one detector 60, as is understood in the art, identifies the most significant "set" or nonzero bit in each of the operands 40 and 42 (other than the sign bit) and controls the shifter 62 to align that most significant set bit of each of the operands 40 and 42 with the most significant bit of the corresponding first subset operand 50 and second subset operand 52. In this way the computationally most important, most significant set bits of the operands 40 and 42 are captured in the truncated first subset operand 50 and second subset operand 52.

The short product 54 is then shifted by a second shifter 64 to locate it in the full product 44 according to the locations derived from the leading one detectors 60. The amount of shifting is simply the sum of the values output by each leading one detector 60 as combined by adder 65. In this example, it will be assumed for clarity that the operands 40 and 42 are unsigned integers without sign bits. In this case, the place of the first non-sign bit is zero. Thus if the "leading one" of operand 40 is in the leftmost place (zero) and the "leading one" of operand 42 is in the second from left most place (1), shifter 64 operates to move the short product 54 by one position to the right when placing it in the full product 44.

As an example, consider multiplication of the following two 16-bit unsigned integer words A and B expressed as binary as received as operands 40 and 42 where:
A=0111 0111 0101 1010 (30554 decimal)
B=000 0011 1011 1011 (955 decimal).

The truncation process will produce the following 28-bit words A' and B':
A'=1110 1110 (LOD=1) and
B'=1110 1110 (LOD=6).
The 16-bit product C (short product 54) will then be:
C'=1101 1101 0100 0100.
This value C' is then shifted seven bits to the right by the sum of the LOD values yielding a 32-bit product C (full product) 44 of:
C=0000 0001 1011 1010 1000 1000 0000 0000 (decimal 29001728).

When this product C is compared with the actual product of 29179070, the product C may be determined to have an accuracy of about 94 percent.

The inventors have determined that the use of two leading one detectors 60 and two shifters 62 can risk negating the energy benefit of using the smaller multiplier 38. Nevertheless gains may be obtained with even smaller multiplier sizes (e.g. 6×6) or by precomputing the truncation of one operand 42 as will be described below.

Static Segment Method (SSM)

Figure 4:
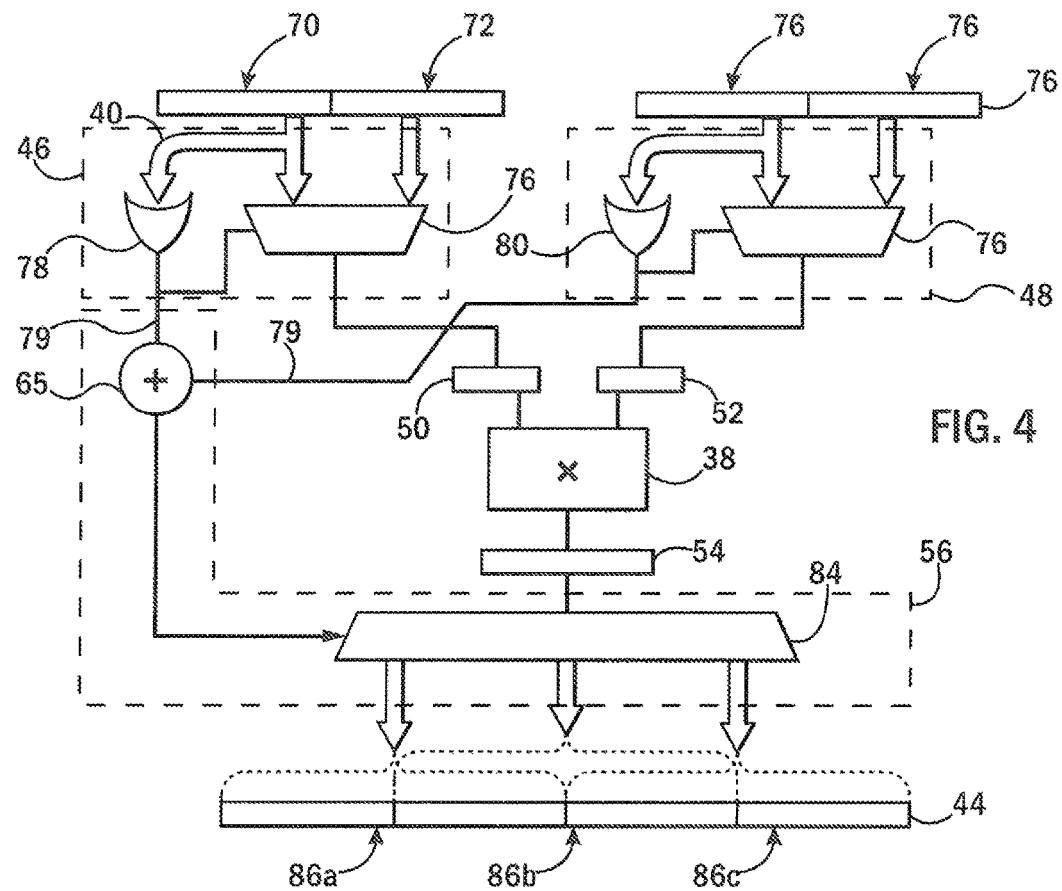
FIG. 4 is a detailed block diagram of an alternative embodiment of the multiplier circuit of FIG. 2 using simpler OR-gates and multiplexers for truncating the operand but only at a limited number of truncation points.

Referring now to FIG. 4, the leading one detector 60 and shifter 62 may be eliminated by selecting the first subset operand 50 and second subset operand 52 from a limited number of positions within their respective operands 40 and 42. In a first example, the selection of subsets will be limited to only two different segments of the operands 40 and 42. A first segment 70 will comprise bits n−1:n-m (designating the range between n-m and n−1) and the second segment 72 of bits m−1:0 of an unsigned integer of length n. Either of these segments 70 or 72 may be routed to the multiplier 38 by a corresponding multiplexer 74 or 76 to provide corresponding operand subsets 50 and 52.

A particular segment 70 or 72 is selected according to whether it contains a leading non-sign bit. Thus, if the first non-sign bit is in segment 70, then segment 70 is routed to the multiplier 38. Otherwise segment 72 is selected. This determination may be readily implemented by a simple OR-gate 78 or 80 (for operands 40 and 42, respectively) receiving the bits from segment 70 from a given operand and providing a control signal 79 to the multiplexers 74 and 76 accordingly for the particular operand 40 or 42.

The values output from the OR-gates 78 and 80 may be also provided to an adder 82 and used to control a demultiplexer 84 which may position short product 54 in one of three locations 86a-86c in the full product 44. For the example of n=16 and m=8, the three possible three locations 86a, 86b and 86c will be overlapping and comprise bits 16-31, 8-23, or 0-15. All of the other bits of the full product 44 will be zero.

Figures 5A, 5B, 5C, 5D:
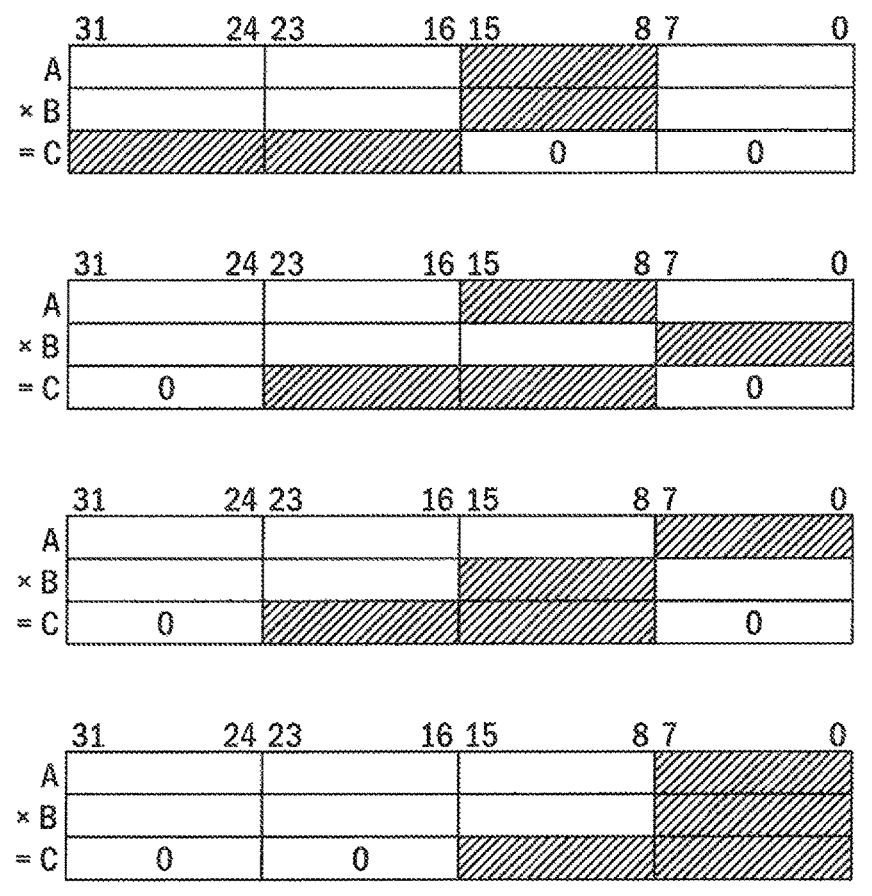

Referring now to FIGS. 5a-5d, for the example above, if the selected segments identified by the OR-gates 78 or 80 are both segment 70 in the range 8-15 as shown in FIG. 5a, the short product 54 will be placed in bits 16-31 of the full product 44 and bits 0-23 of the full product 44 will be padded with zeros, if the selected segments for one operand 40 or 42 is segment 70 in the range of 0-7 and for the other operand 40 or 42 is segment 72 in the range of 8-15 as shown in FIGS. 5b and 5c, the short product 54 will be placed in bits 8-23 of the full product 44 and the remaining bits of the full product 44 padded with zero. Finally if the selected segments for both of the operands 40 and 42 are segments 72 in the range of 0-7, then the short product 54 will be placed in the range 0-15 of the full product 44 and the remaining bits of the output product padded with zeros.

Extended Static Segment Method (ESSM)

The above approach can be inaccurate when the most significant set bit of the segment 70 is near the right side of the segment 70, for example, with operand 40 or 42 of the following type:

0000 0001 xxxx xxxx or 0000 0010 xxxx xxxx where values labeled "x" are not of concern because they are not within the selected segment.

Figure 6:
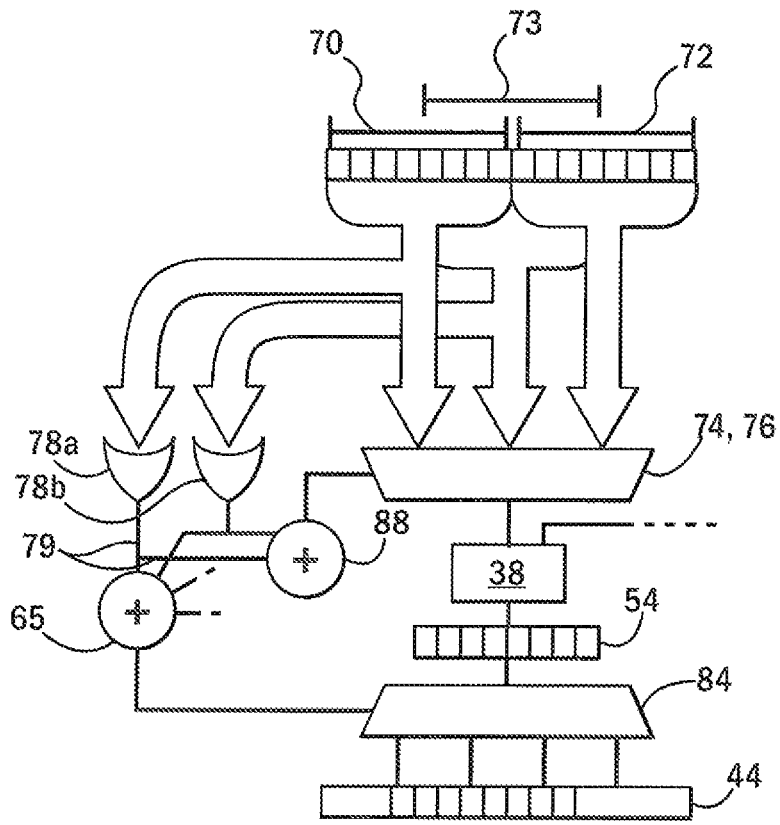
FIG. 6 is a fragmentary view of a third embodiment of the invention allowing for three different truncation options for each operand.

This inaccuracy may be overcome by choosing the value of m that is significantly greater than n/2 or by allowing multiple overlapping segments as shown in FIG. 6. In this case each multiplexer 74, 76 may select from among three different overlapping segments 70, 72, and 73 where, for example, in the case of 16-bit operands 40 and 42, segment 72 may include bits 0-7, segment 73 may include bits 4-11, and segment 70 may include bits 8-15. Two OR-gates 78*a* and 78*b* may be used to read each of the data elements of segment 70 and segment 73, respectively, and the sum of their outputs, provided by adder 88, used to control the multiplexers 74, 76 associated with the different operands 40 and 42.

The sum of all the control signals 79 from the OR-gate 78 for both operands 40 and 42 in the system may be used to control the demultiplexer 84 which may now direct the short product 54 to any of five different offsets in the full product 44 depending on the state of the four different OR-gates 78. Although the four OR-gates produce 16 different states, these different states may map to only five different output segment locations in a manner analogous to that described above with respect to the mapping of four different states to only three offsets in FIG. 5.

Generally the number of static segments will be relatively small compared to n in order to gain computational efficiencies. Typically the number of static segments will be less then n/2 and preferably less than 2(n/m) to provide successive overlapping segments.

Figure 7:
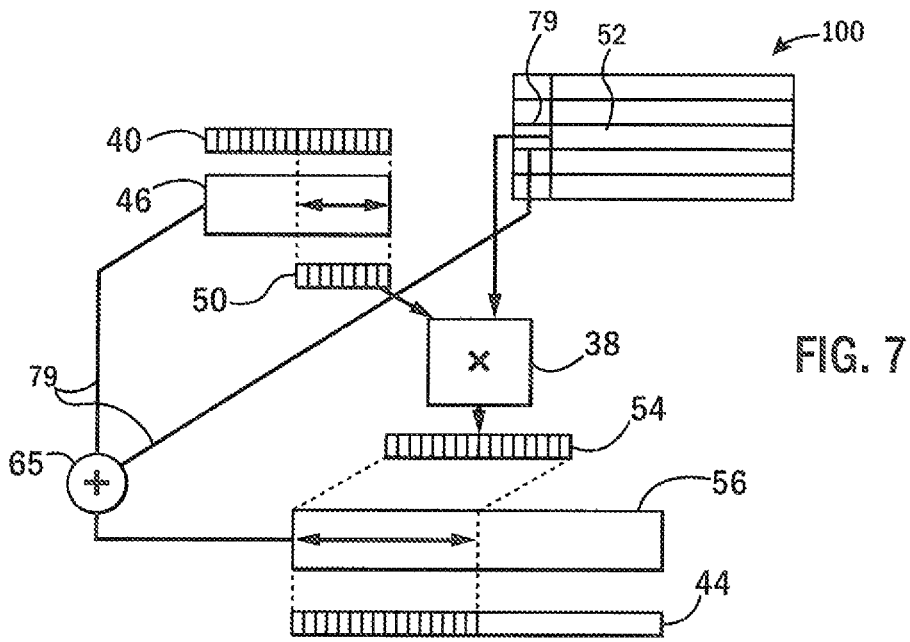
FIG. 7 is an alternative embodiment of FIG. 2 showing one operand pre truncated and stored in memory.

Referring now to FIG. 7, when one operand (for example, operand 42 as shown in FIG. 2) represents a coefficient used in a repeated calculation, for example, the above recognition problems, that operand 42 may be substantially constant in time representing, for example, a fixed vocabulary of words that may be recognized. This consistency of the operand 42 can be practically true even if the vocabulary is periodically adjusted slightly.

In these situations, for any of the above described embodiments, one operand 42 may be truncated before use by the multiplier circuit 18 according to any of the above described rules, for example, by a compiler. The control signal 79 indicating the location of the bits selected from the operand 42 and the subset operand 52 are both stored in a table 100 in memory indexed to a given operand 42. When a operand 40 is to be multiplied with a operand 42, the table 100 is used to obtain the first subset operand 50 corresponding to the operand 42 and the control signal 79. The first subset operand 50 is provided to the multiplier 38 and the control signal 79 summed with the control signal 79 associated with operand 40 and used by the alignment circuit 56.

While the present application has been described with respect to its use in human machine interfaces including speech recognition, handwriting recognition, gesture recognition and the like, it should be understood that the invention is not limited to these applications although it provides a particular benefit in these applications particularly when used in the mobile device.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", the and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a computer" and "a processor" or "a core" can be understood to include one or more processors that can communicate in a stand-alone and/or a distributed environment(s), and can thus be configured to communicate in wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. An electronic computer comprising:
   a processor for execution of arithmetic and logic instructions and including a multiplication circuit for multiplication of data values, the multiplication circuit:
   (i) receiving a first and second operand, the first operand having a bit length of n bits;
   (ii) selecting a first subset operand from the first operand of bit length m less than n, the first subset operand selected from the first operand according to a position of a leading non-zero, non-sign bit in the first operand and truncating non-zero bits of the first operand; and
   (iii) providing an output equal to a product between the subset operand and the second operand.

2. The electronic computer of claim 1 wherein the product is provided by a fixed-point multiplier limited to receiving operands no greater than m-bits in length.

3. The electronic computer of claim 2 wherein the multiplication circuit selects the first subset operand to have a most significant bit of the first subset operand equal to the leading non-zero, non-sign bit.

4. The electronic computer of claim 3 wherein the multiplication circuit includes a leading one detection circuit, an input shifter and an output shifter, the leading one detection circuit detecting a location of a most significant non-zero, non-sign bit in the first operand and wherein the leading one detection circuit controls the input shifter to select bits of the first operand for multiplication; and wherein the leading one detection circuit further controls the output shifter shifting the output to different positions in an output word provided by the leading one detection circuit.

5. The electronic computer of claim 2 wherein the multiplication circuit selects the first subset operand only from less than n/2 predetermined subsets of the first operand.

6. The electronic computer of claim 5 wherein the multiplication circuit includes a logical OR circuit, a multiplexer, and a demultiplexer, the logical OR circuit detecting a presence of a one bit in at least one of the predetermined subsets to select the first subset as a subset including a most significant non-zero, non-sign bit and wherein the logical OR circuit controls a multiplexer selecting bits of the selected predetermined subset of the first operand for multiplication; and wherein the logical OR circuit further controls the demultiplexer shifting the output to different positions in an output word provided by the multiplication circuit.

7. The electronic computer of claim 1 wherein the multiplication circuit selects the first subset operand to include a leading non-zero, non-sign bit of the first operand and only bits of lower significance than the leading non-sign bit up to the total bit length of m.

8. The electronic computer of claim 1 wherein m is greater than or equal to one-half of n.

9. The electronic computer of claim 1 wherein the multiplication circuit further receives a third operand having a bit length of n bits and selects as the second operand a subset of the third operand having a bit length m less than n selected from the third operand according to the position of a leading non-zero, non-sign bit in the third operand and truncating non-zero bits of the third operand.

10. The electronic computer of claim 9 wherein the multiplication circuit selects the second operand from the third operand to include a leading non-zero, non-sign bit of the first operand and bits of lower significance than the leading non-zero, non-sign bit.

11. The electronic computer of claim 10 wherein the multiplication circuit selects the second operand to have a most significant bit of the second operand equal to the leading non-zero, non-sign bit.

12. The electronic computer of claim 10 wherein the multiplication circuit selects the second operand only from less than n/2 predetermined subsets of the first operand.

13. The electronic computer of claim 1 wherein the electronic computer further includes a memory holding the second operand stored in memory and wherein the second operand has a bit length of n bits.

14. The electronic computer of claim 1 wherein the electronic computer includes a battery power providing power to circuitry of the electronic computer supply and at least one of a wireless communication transceiver, a graphics display screen and a camera.

15. A method of conserving electrical power in a portable electronic device having an electronic computer including a processor for execution of arithmetic and logic instructions and a multiplication circuit for multiplication of data values comprising the steps of:
  (i) receiving a first and second operand, the first of operand having a bit length of n bits;
  (ii) selecting a first subset operand from the first operand of bit length m less than n, the first subset operand selected from the first operand according to a position of a leading non-zero, non-sign bit in the first operand and truncating non-zero bits of the first operand; and
  (iii) providing an output equal to a product between the subset operand and the second operand.

16. The method of claim 15 further including the step of receiving a third operand and selecting a second subset operand from the third operand of bit length m less than n, the second subset operand selected from the third operand according to a position of a leading non-zero, non-sign bit in the third operand and truncating non-zero bits of the third operand and using the second subset operand as the second operand.

17. The method of claim 15 further including the step of executing a program stored in non-transitory medium on the electronic computer multiplying a series of run-time varying operands with a set of predetermined operands further comprising the steps of:
  (a) extracting a series of storable subsets from the predetermined operand of bit length m less than n, the storable subsets selected according to a position of a leading non-zero, non-sign bit in the predetermined operands and truncating non-zero bits of the first operand;
  (b) storing the storable subsets for each predetermined operand indexed to the operand; and
  (c) multiplying the first subset of the first operand by a storable subset of the second operand.

* * * * *